United States Patent
Richard

[11] Patent Number: 6,056,797
[45] Date of Patent: May 2, 2000

[54] DUST COLLECTOR FILTER CLEANING CONTROL SYSTEM

[76] Inventor: Kenneth L. Richard, P.O. Box 538, Uwchland, Pa. 19480

[21] Appl. No.: 09/096,474

[22] Filed: Jun. 12, 1998

[51] Int. Cl.⁷ .................................................. B01D 41/00
[52] U.S. Cl. .............................. 55/302; 55/350.1; 55/418; 55/484; 96/428
[58] Field of Search ............................... 55/283, 302, 342, 55/418, 467, 484, DIG. 34, 350.1; 96/428; 137/505

[56] References Cited

U.S. PATENT DOCUMENTS

| | | |
|---|---|---|
| 3,805,823 | 4/1974 | Kakegawa . |
| 4,298,360 | 11/1981 | Poll . |
| 4,331,459 | 5/1982 | Copley ........................................ 55/302 |
| 4,445,913 | 5/1984 | Nishiyama ................................. 55/302 |
| 4,726,820 | 2/1988 | Stanelle ..................................... 55/302 |
| 4,923,068 | 5/1990 | Crowson . |
| 5,843,206 | 12/1998 | Dehn et al. . |

*Primary Examiner*—David A. Simmons
*Assistant Examiner*—Fred Prince
*Attorney, Agent, or Firm*—Brady, O'Boyle & Gates

[57] ABSTRACT

A dust collector filter cleaning control system employing high-pressure compressed air pulses, wherein the dislodged dust particulate is prevented from returning to the filters after the high-pressure compressed air cleaning thereof by briefly maintaining a positive low-pressure compressed air within the cleaned filters so that the particulate removed from the filters has time to drop into the collector hopper. The same source of compressed air is employed for both the filter cleaning air pulses and the sustaining low air pressure for preventing the re-entrainmnet of the dust particles into the filters.

5 Claims, 1 Drawing Sheet

DUST COLLECTOR FILTER CLEANING CONTROL SYSTEM

BACKGROUND OF THE INVENTION

There are various dust collectors having filter media in the form of cartridges, bags, etc. which have to be cleaned periodically by applying pulsed jets of high-pressure, compressed air thereto. Heretofore, the high-pressure cleaning pulse takes a few of the filters "off-lne" since the energy so expended more than overcame the system's fan's energy on those filters. But the time "off-line" for this cleaning pulse, typically, 0.15 seconds, is so brief that any particles removed from the filters by the high-pressure pulse are most prone to return to the filter. In a typical jet pulse dust collector, approximately 3 percent of the dust on a filter is finally removed from the filter. It is apparent that such equipment is operationally defective, and, therefore, expensive.

To overcome this low effectiveness, the dust collector filter cleaning control system of the present invention has been devised, whereby the particles are prevented from returning to the filter, coincident with a reduction of air usage due to more effective cleaning.

SUMMARY OF THE INVENTION

The dust collector filter cleaning control system of the present invention is adapted for use in an industrial dust collector of the type disclosed in my U.S. Pat. No. 4,610,704 dated Sep. 9, 1986, wherein the filter units are cleaned by firing compressed air pulses to remove the particulates from the exterior filter surface.

The control system of the present invention comprises, essentially, a bypass fine communicating with the conventional high-pressure line communicating with the pulse jets in the filter housing. A low-pressure regulator is mounted in the bypass line, and a solenoid actuated switching valve is mounted in the high-pressure fine downstream from the inlet of the bypass fine. A microprocessor is connected to the solenoid actuated switching valve in the high-pressure line and to the pulse jets in the filter housing. By this construction and arrangement during the cleaning of the filters, the pulse jets receive a signal from the microprocessor to fire compressed air pulses against the filters. Instantly, after the cleaning pulse, the solenoid actuated switching valve receives a signal from the microprocessor to close the switching valve, thereby causing air to flow through the low-pressure regulator im the bypass line. The low-pressure air flows into the filter to function as a back pressure to the normal on-fine air flow from the system's fan, thereby preventing dust particles which had been removed from the filters during the compressed air pulse cycle from returning to the filters.

By this construction and arrangement, the same source of compressed air is employed for the filter cleaning pulsed air jets, and the low air pressure for preventing the re-entrainment of the dust particles.

DESCRIPTION OF THE PREFERRED EMBODIMENTS

Figure 1:
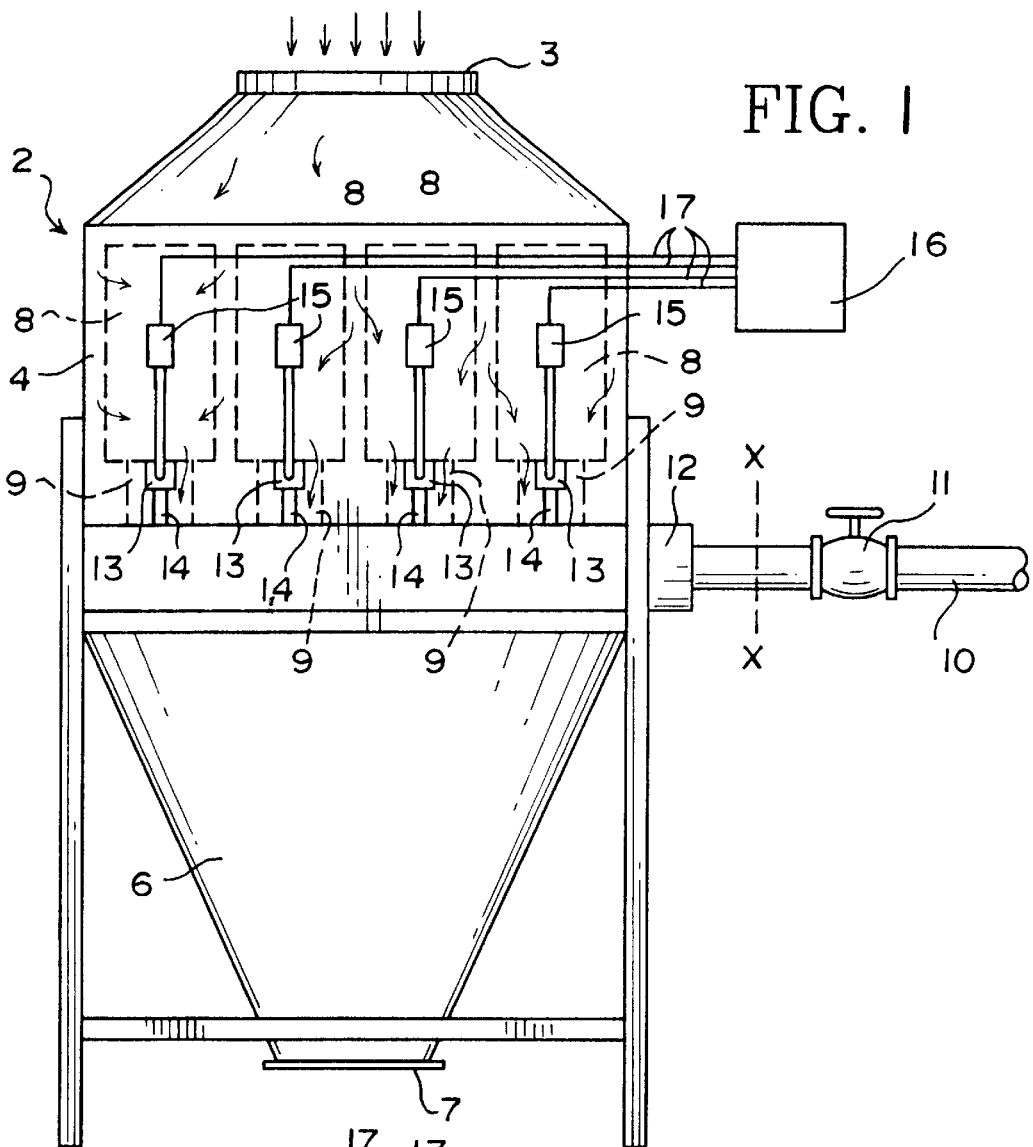
FIG. 1 is a diagrammatic view of an industrial dust collector of the type, wherein the filter units are cleaned by firing compressed air pulses against the filters to remove dust particles collected on the exterior filter surfaces.
Figure 2:
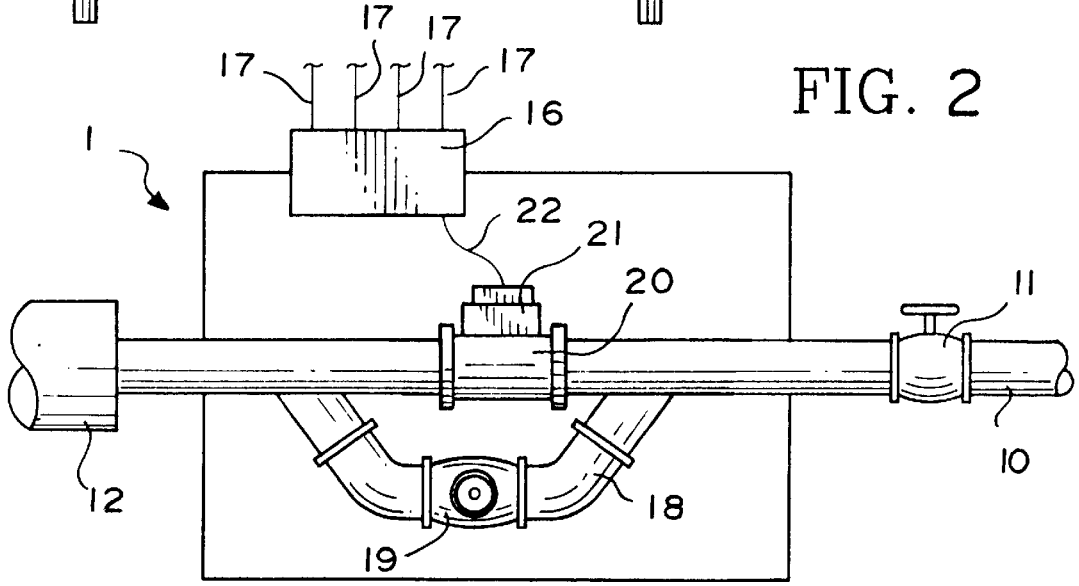
FIG. 2 is a diagrammatic view of the compressed air control system employed in the dust collector illustrated in FIG. 1.

Referring to the drawing and, more particularly, to FIGS. 1 and 2, the filter cleaning control system 1 of the present invention is adapted to be installed in an industrial dust collector 2 of the type disclosed in my U.S. Pat. No. 4,610,704 dated Sep. 9, 1986, the disclosure of which is incorporated herein by reference. The dust collector 2 includes a housing having an inlet opening 3 at the top thereof for the admission of particulate-laden gases. An intermediate section 4 of the housing provides a dirty gas chamber, and the hopper or lower portion 6 of the housing tapers downwardly to a clean-out or dust discharge opening 7. The intermediate section 4 of the housing encloses a plurality of rows of individual filter elements 8 which are rigid cartridge type filters closed at their upper ends and open at their bottom ends. A plurality of clean air ducts 9 are positioned below the filter elements 8 and communicate with the lower open ends thereof.

From the structure thus far described, it will be apparent that the particulate-laden gases, flowing downwardly through the inlet 3, surround the filter elements 8 and flow radially inwardly through each filter, leaving some dust particles entrained on the outer surface of each filter 8, while some other particles will continue on to the lower portion 6 of the housing. The cleaned gases exit from the center portion of the filter elements 8 into the clean air ducts 9, through which they are conducted from the housing to the atmosphere.

In order to periodically remove the accumulated dust particles on the outer surface of each filter 8, a reverse flow cleaning of the individual filter elements 8 is provided. To this end, a pipe 10, having a high-pressure regulator 11, is connected at the end to a source of high-pressure compressed air, not shown, and at the other end to a header 12. The header 12 communicates with a plurality of diaphragm valves 13 through a plurality of conduits 14. Each valve 13 communicates with the lower open end of a respective filter element 8, and the actuation of the valves is controlled by a plurality of solenoids 15, electrically connected to a microprocessor 16 by a plurality of electrical wires 17. By this construction and arrangement, the microprocessor 16 controls the actuation of the solenoid actuated valves 13 to permit the periodic pulsed firing of air jets into the filters 8, to thereby remove the particulate from the outer surface of each filter 8.

The pressure wave of a pulsed air jet must not only overcome the normal on-line air flow passing through the collector 2 from the system's fan, but also must move the dust particles away from the filters 8 to clean the filters. Since the pulse time is so brief, typically, 0.15 seconds, the dust particles have a tendency to return to the filter 8, rather than toward the dust discharge opening 7. To overcome this problem, the control system of the present invention has been devised, whereby after pulsing the filter 8, the compressed air system remains open continuing to supply compressed air to the filters, but at a reduced pressure which offsets the pressure caused by the system fan.

The control system of the present invention is illustrated in FIG. 2 and is inserted at X—X in FIG. 1. The control system comprises a bypass line 18, having a low-pressure regulator 19, which is mounted in the high-pressure compressed air line 10. A switching valve 20, having a solenoid actuator 21, is mounted in the high-pressure line 10 downstream from the inlet of the bypass fine 18. The solenoid 21 is electrically connected, as at 22, to the microprocessor 16.

In the operation of the control system, the microprocessor 16 first controls the actuation of the valves 13 for pulsing the filters 8 as described hereinabove. The solenoid 21 then receives a signal from the microprocessor 16 to close switching valve 20, whereby the high-pressure air flowing through pipe 10 is directed into the bypass hie 18, through low-pressure regulator 19, into the header 12, from where the low-pressure air flows through the valves 13, into the filters 8. The high-pressure air for the cleaning pulse is typically from 60 psi to 100 psi. The low-pressure air, employed after cleaning for maintaining a back pressure to the normal online air flow from the system's fan, is 5 psi to 15 psi. The time duration of this fan-offsetting pressure flow will vary with different collectors; however, it has been found that 1 to 8 seconds at 5 psi to 15 psi provides sufficient time for those particles, which have been removed from the filter 8 to proceed to the hopper 6, rather than being instantly re-entrained on the filter 8.

The control system of the present invention enhances the ability to clean filters more efficiently by minimizing the re-entrainment of dust particles back into the cleaned filters, thereby providing higher filter performance and life, more air flow capacity, less power cost per CFM of dirty gas, and less downtime. The control system can be employed in various types of jet pulse collectors, whether upflow or downflow, and having filter media which is relatively rigid, such as needled felt bags and filter cartridges whether of cellulose, fabric, glass, and the like. This control system may be installed in original equipment or may be retrofitted to existing installations.

It is to be understood that the form of the invention herewith shown and described is to be taken as a preferred example of the same, and that various changes in the shape, size, and arrangement of parts may be resorted to, without departing from, the spirit of the invention or scope of the subjoined claims.

I claim:

1. A dust collector filter cleaning control system comprising a dust collector, including a housing having an opening for the admission of particulate-laden gases conveyed thereto by a normal on-line air flow fan and an outlet for conveying clean gases therefrom, a plurality of filters having outer surfaces mounted in said housing for collecting particles on the outer surfaces thereof from the incoming particulate-laden gases, said plurality of filters being arranged in rows, a cleaning system for removing said particles from said surfaces, said cleaning system comprising a high-pressure compressed air line, a valve at each row of said filters communicating with said high-pressure compressed air line, an actuator connected to each valve, a timer being operatively connected to said actuator for opening and closing said valve for applying a periodic pulsed firing of high-pressure compressed air jets against the filters to thereby remove particles from the outer surfaces thereof, and a control system to prevent particles from returning to the filters after a high-pressure pulse of compressed air jets, said control system comprising a bypass line communicating with said high-pressure compressed air line, a source of low-pressure air communicating with said bypass line and the valve at each row of said filters, a switching valve mounted in said high-pressure compressed air line, an actuator connected to said switching valve, said timer operatively connected to the actuator for said switching valve, whereby during a brief period after one or more high-pressure cleaning pulses, the switching valve is closed and the valve at each row of filters is open resulting in low-pressure air flowing to the filters, to thereby maintain briefly, a back pressure to the normal on-line air flow fan to prevent the return of the particles onto the surface of the filters.

2. A dust collector filter cleaning control system according to claim 1, wherein the bypass line has an inlet and an outlet, and a low-pressure regulator mounted in said bypass line.

3. A dust collector filter cleaning control system according to claim 1, wherein the timer comprises a microprocessor.

4. A dust collector filter cleaning control system according to claim 1, wherein the actuator connected to each valve at each of said filters comprises a solenoid.

5. A dust collector filter cleaning control system according to claim 1, wherein the actuator connected to said switching valve comprises a solenoid.

\* \* \* \* \*